UNITED STATES PATENT OFFICE.

MEINHARD HOFFMANN AND ARTHUR WEINBERG, OF MAINKUR, NEAR FRANKFORT-ON-THE-MAIN, ASSIGNORS TO LEOPOLD CASSELLA & CO., OF FRANKFORT-ON-THE-MAIN, GERMANY.

BLUE DYE.

SPECIFICATION forming part of Letters Patent No. 442,680, dated December 16, 1890.

Application filed August 9, 1890. Serial No. 361,557. (Specimens.) Patented in France April 30, 1890.

*To all whom it may concern:*

Be it known that we, MEINHARD HOFFMANN and ARTHUR WEINBERG, citizens of the Kingdom of Prussia, and residents of Mainkur, near Frankfort-on-the-Main, have invented certain new and useful Improvements in the Manufacture of Basic Blue Dye-Stuffs, (for which we have received Letters Patent in France April 30, 1890,) of which the following is a specification.

We have found that by the action of the secondary bases of the series of fat bodies, as dimethylamine, diethylamine, upon the coloring-matters belonging to the class of the oxazines, new bases are formed, which by oxidation are transformed into greenish-blue coloring-matters of very pure shades. These coloring-matters belong to a new class of chemical compounds the constitution of which is not yet exactly known. The chemical difference between this new class and the so-called "oxazines" (new blues) consists in the addition of a strongly basic group $(N(CH_3)_2)$ and in the loss of two atoms of hydrogen. They probably contain a new chromophore. New blue is precipitated from its aqueous solution by alkalies and the blue color is changed into brown, while solutions of the new bodies are not precipitated by alkalies, the bases being soluble in water with blue shades. New blue dissolves in sulphuric acid with a green shade, the new substance with a brown color.

For the production of the coloring-matters herein described we more especially use the dark-blue bodies known by the name of "new blues," which have been since 1883 introduced on the market by Leopold Cassella & Co. These substances, which may be designated by the chemical expression dimethyle or diethyle amidonaphtophenoxazine chloride, were discovered by Meldola. They are produced by the action of nitroso-dimethyl-aniline or nitroso-diethylaniline upon $\beta$ naphtol.

We proceed, for instance, as follows:

*Example.*—Thirty-two kilograms of pure new blue R (dimethylamidonaphtophenoxazine chloride) are powdered and mixed with an aqueous solution containing about thirty to forty per cent. of dimethylamine. After a short time all of the coloring-matter will be transformed into a slightly-colored greenish body difficultly soluble in water, but soluble in diluted hydrochloric acid. This body is oxidized by stirring during several days in a current of air at a temperature of 15° centigrade until the mass has become dry. The oxidation is terminated as soon as a sample dissolves in hot water almost without residue with a blue color. Then the product is introduced into one thousand litres water neutralized with hydrochloric acid, filtered, cooled down to about 15° centigrade, and precipitated with common salt. The coloring-matter separates in fine green needles. The oxidation may also be performed by means of chloride of iron, bichromate of potash, or peroxides. In these cases the process is to be carried out in weakly acidulated solution. Similar products are produced when diethylamine or diethylamidonaphtophenoxazine chloride are used in place of the corresponding bodies in the above example.

These coloring-matters dye cotton mordanted with tannin a very pure greenish blue fast to soaping and light.

What we claim as new, and desire to secure by Letters Patent, is—

As a new article of manufacture, the greenish-blue coloring-matter hereinbefore described, showing the following characteristics: it forms a dark-greenish or crystalline powder; it dissolves easily in water with a blue color; it is soluble in spirit, nearly insoluble in benzine or ether; it dissolves in strong sulphuric acid with a brown shade.

In testimony that we claim the foregoing as our invention we have signed our names, in presence of two witnesses, this 30th day of July, 1890.

MEINHARD HOFFMANN.
    ARTHUR WEINBERG.

Witnesses:
    LUDWIG MASCHMANN,
    ALVESTO P. HOGUE.